Sept. 18, 1923.
R. L. YOUNG
STORAGE BATTERY CIRCUITS
Filed April 9, 1920
1,468,096
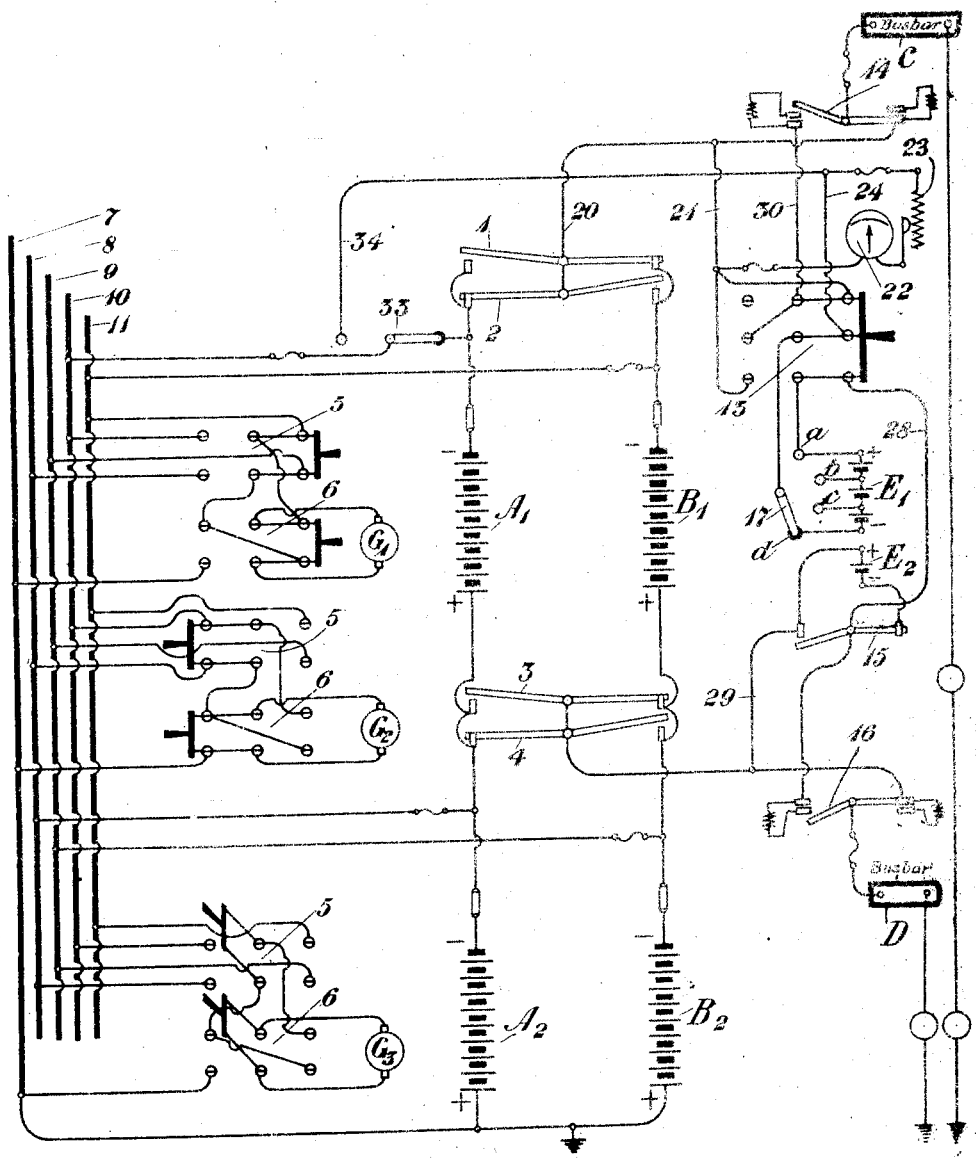
INVENTOR.
R. L. Young
BY
ATTORNEY Patented Sept. 18, 1923.

1,468,096

UNITED STATES PATENT OFFICE.

ROWLAND L. YOUNG, OF EAST ORANGE, NEW JERSEY, ASSIGNOR TO AMERICAN TELEPHONE AND TELEGRAPH COMPANY, A CORPORATION OF NEW YORK.

STORAGE-BATTERY CIRCUIT.

Application filed April 9, 1920. Serial No. 372,644.

*To all whom it may concern:*

Be it known that I, ROWLAND L. YOUNG, residing at East Orange, in the county of Essex and State of New Jersey, have invented certain Improvements in Storage-Battery Circuits, of which the following is a specification.

This invention relates to storage battery circuits.

In certain types of current supply circuits, where it is of importance that the supply of power shall be uninterrupted, it is customary to float a storage battery on the load circuit, so that this battery will supply the power during a temporary failure of the generator. Although the battery is fully charged under normal conditions, it has been found advisable, in order to prolong the life thereof, to subject the same at intervals to an overcharge. Where the voltage regulation of the load circuit is of importance, as for example in telephone practice, it is necessary to take precautions against potential variations in the load circuit due to the charging of the battery. The present invention is concerned with methods of and means for preventing such voltage variations. It proposes to divide the battery into parallel sections and to disconnect one of these sections at a time and charge the same from a separate source, leaving the other section thereof floating on the load circuit to regulate the voltage thereof.

The above feature, by means of which at least one of the sections of the battery is always retained bridged on the load circuit, is of particular importance in telephone practice because the battery forms a low resistance shunt across the telephone circuits, thus short-circuiting cross talk and other noise currents. In case there is a breakdown of the generators at the time when one of the sections of the battery is being charged, the section which is retained bridged across the circuit will begin to discharge and thus prevent even a momentary interruption of the current supply.

To prevent a drop in the voltage of the load circuit, as the battery discharges during a breakdown of the generators, the invention provides an emergency battery which may be connected in series with the main battery to augment the voltage thereof, the voltage of the emergency battery being preferably adjustable, so that it may be increased as that of the main battery falls. The emergency battery is normally retained in a fully charged state by being bridged across the load circuit so that a small charging current normally flows therethrough, sufficient in value to replenish the internal losses thereof. A separate circuit is provided to give the emergency battery an occasional overcharge or to re-charge the same after an emergency discharge.

A good understanding of the invention may now be had from the following description having reference to one form of embodiment thereof, shown in diagrammatic view in the accompanying drawing.

In this drawing reference characters $A_1$, $A_2$, $B_1$ and $B_2$ designate secondary batteries, of which those which have like reference letters are connected in series with each other. The positive terminals of batteries $A_2$ and $B_2$ are connected to ground and the negative terminals of either, or both, batteries $A_1$ and $B_1$ may be connected to a load bus-bar, designated C, by means of switches 1 and 2. Similar switches 3 and 4 are provided for associating the batteries $A_2$ and $B_2$ with another load bus-bar, designated D. The bus-bars C and D are respectively high-voltage and low voltage bus-bars. In a telephone plant, for example, the bus-bar D may be maintained at about 24 volts and the bus-bar C at about 48 volts. Primary sources of current, herein shown as generators $G_1$, $G_2$ and $G_3$, are provided for charging the batteries and each generator is provided with a pair of switches 5 and 6, whereby it may be selectively connected to any pair of battery bus-bars designated 7 to 11 inclusive, the arrangements of the connections being such that any one of the generators may be utilized for charging any one of the batteries, as I shall now describe. The bus 7 is connected to ground, buses 10 and 11 are connected to the negative terminals of batteries $A_1$ and $B_1$ and buses 8 and 9, to the negative terminals of the batteries $A_2$ and $B_2$. Each switch 5 is of the double pole, double throw type and its left contacts are connected to the buses 8 and 10 whereas its right contacts are connected to the buses 9 and 11. When, therefore, the handle of the switch is thrown to the left, it connects the intermediate poles of the switch with battery $A_1$ and when thrown to the right, it associates these poles with the battery $B_1$. The switches 6 are of the same type as the switches 5 and each switch is so arranged that, when thrown to the right, it connects the generator $G_1$, $G_2$ or $G_3$ as the case may be, with the intermediate poles of the adjacent switch 5, so that the generator is associated with battery $A_1$ or $B_1$, according to the position of switch 5. The lower lefthand contact of each switch 6 is connected to the ground bus-bar 7 and the upper lefthand contact to the lower intermediate pole of switch 5. Consequently, if the handle of switch 6 is thrown into its left position, the generator associated therewith is connected to battery $A_2$ or $B_2$ according to the position of switch 5. It is thus apparent that by proper selective operation of switches 5 and 6 any generator may be connected to any battery.

In the preferred mode of operation of this system the switches 1 to 4 inclusive are so arranged that both A and B batteries are connected in parallel to the bus-bars, as indicated in the drawing. During normal operation these batteries are fully charged and floated on any two of the generators, as $G_1$ and $G_2$, the switches of which are shown in the drawing in such positions that generator $G_1$ is bridged across batteries $A_1$ and $B_1$, whereas $G_2$ is connected across batteries $A_2$ and $B_2$. The potentials of these generators are so adjusted that the batteries draw normally little or no current from the line but float on the load circuit in a fully charged state, the load current being supplied by the generators. This potential is approximately 2.10 volts per cell for the ordinary type of lead storage battery. Normally, therefore, these batteries are fully charged and available for supplying the load current in case of a breakdown of the generators.

To retain the batteries in prime condition they are subjected from time to time to an overcharge. To avoid a change in potential in the load circuit during such a charge, I subject only a part of the total battery to the overcharge and leave the remaining part thereof floated on the circuit. In case, for example, it is desired to overcharge the battery $A_1$, switch 2 is thrown to disconnect the negative terminal of battery $A_1$ from the load bus C and the switches 5 and 6 of generator $G_3$ are thrown to the left and right respectively to connect the same across the battery $A_1$. The potential of generator $G_3$ is so adjusted that full charging current flows through battery $A_1$, this potential being approximately 2.60 volts per cell in the ordinary type of lead storage battery. It will be observed that while battery $A_1$ is thus being overcharged it is disconnected from the load bus-bar so that it cannot cause a change in the voltage thereof. The other portions of the battery remain bridged across the load circuit as before, so that there can be no interruption of the load current if there should be a breakdown of the load current generators. Any portion of the battery may thus be overcharged without causing a change in the voltage of the load circuit, and without necessitating the disconnection of the entire battery from the load circuit. This is a highly important feature where constancy of voltage and continuity of current is required.

Emergency batteries $E_1$ and $E_2$ are provided for retaining the voltage of the system at the normal value during an emergency discharge of the battery. These emergency batteries are normally fully charged, being retained in this condition by a circuit which extends from switches 1 and 2 of the main batteries through conductor 20 and 21, ammeter 22, variable resistance rheostat 23, conductor 24, switches 13 and 17 in the positions shown in the drawing, battery $E_1$, switch 13, conductor 28, switch 15 in the position shown in the drawing, battery $E_2$, conductor 29 to switches 3 and 4 of the main battery. The rheostat 23 is so adjusted that the current flowing through the batteries is sufficient merely to replenish the internal losses of the cells, so that the batteries normally remain fully charged.

In case of a power failure the switches 5 and 6 of the generators are opened so that the load current is supplied by the main batteries. If any of these are at the time disconnected from the load bus-bar they should be reconnected thereto so that the full capacity of the batteries is available for supplying the load current until the generators can be restored for use. The charge of batteries $E_1$ and $E_2$ is stopped by reversing switch 13 and operating contact arm 17 of switch $E_1$ to the position designated $a$. To offset the gradual fall in potential of the main batteries as they discharge, the emergency batteries $E_1$ and $E_2$ are connected in series therewith, this connection being effected by reversing switches 14 and 16, so that the circuit of bus C now extends from switches 1 and 2 through conductors 20 and 21, through the lowermost blade of switch 13, contact "$a$" on the emergency battery $E_1$, switcharm 17, the middle blade of switch 13, conductor 30 and switch 14 to bus-bar C. As the voltage of the bus C drops during the discharge of the batteries, the switcharm 17 is moved consecutively from position "$a$" to positions $b$, $c$ and $d$, thus augmenting the voltage of the main battery to such extent that the potential of the bus-bar remains practically constant until the discharge limit is reached. The circuit for the main bus D extends from the switches 3 and 4, through conductor 29, battery $E_2$, switch 15 normal, and 16 reversed, to the bus-bar D. It will be observed that only one cell is provided in the arrangement herein illustrated for retaining the bus D at its normal potential, but it is readily understood that where it is desirable to have a greater number of cells so that a finer adjustment of the potential of the bus is possible, this may be accomplished by a switching arrangement similar to that of battery $E_1$. The switches 14 and 16 are arranged to close their left contacts before they open their right ones, and vice versa, so that there can be no break in the bus-bar circuits when these switches are operated. They may also be provided with suitable resistances to prevent excessive currents during the momentary short circuits of batteries $E_1$ and $E_2$.

To recharge the emergency batteries after a discharge they are provided with a charging circuit, which extends from the battery bus-bar 10 through the switch 33 in its left position, conductors 34 and 24, switches 13 and 17 in the positions shown in the drawing, conductor 28, switch 15 in the position shown in the drawing, battery $E_2$, conductor 29 and switches 4 and 3 to the battery bus-bar 8. One of the charging generators, as $G_3$, may be connected across buses 8 and 10, by throwing its switch 5 to the left and switch 6 to the right, the potential of the generator being adjusted to supply full charging current to the emergency batteries. This charging circuit may also be used for giving the emergency batteries an occasional overcharge.

Although I have herein shown and described only one form and arrangement of circuits embodying the invention, and only one form of method of practicing the same, it is readily understood that various changes and modifications may be made therein within the scope of the following claims without departing from the spirit and scope of the invention.

What I claim is:

1. In combination, a plurality of primary sources of current, a plurality of main secondary sources of current, means for selectively connecting certain of the said primary and secondary sources in parallel, a load circuit, means for selectively connecting to said load circuit one or more of said secondary sources, an auxiliary secondary source of current, a circuit for normally maintaining said auxiliary source in a charged state by current from said load circuit, means for at times interrupting said normal circuit and connecting said auxiliary source in series with said main secondary sources in said load circuit to augment the potential thereof, and means for at times connecting one of said primary sources of current across said auxiliary secondary source to restore full charge therein.

2. In combination, a plurality of primary sources of current, a plurality of main batteries, means for selectively connecting said primary sources across said main batteries, a load circuit, switching means for connecting said batteries to and disconnecting the same from said circuit, said means being so arranged as to connect the batteries in parallel relationship when more than one thereof is connected in said circuit, an auxiliary battery, a connection for normally bridging said auxiliary battery across said load circuit to maintain the said battery in a charged state, means for at times interrupting said connection and associating said auxiliary battery with said main battery to augment the potential thereof, a device for regulating the effective potential of said auxiliary battery, and a circuit for at times restoring full charge in said secondary auxiliary battery.

3. In combination, a main battery comprised of a plurality of parallel sections, each of said sections being composed of a plurality of portions in series with each other, a plurality of primary sources of current, means for selectively connecting said sources in parallel to said portions of the main battery, a high voltage load circuit and a low voltage load circuit, switching means for connecting one or more parallel section of said main battery in said high voltage load circuit, switching means for connecting one or more of said portions of said parallel battery sections in said low voltage load circuit, an auxiliary battery for each of said load circuits, a connection for normally bridging said auxiliary batteries in series with each other across a portion of said main battery to retain said auxiliary batteries in a charged state, switching means for at times connecting one of said auxiliary batteries in series with the main battery in said high voltage load circuit and the other of said auxiliary batteries in series with the portion of the main battery connected in said low voltage load circuit to augment the potentials of said circuits, and a circuit for at times restoring the charge in said auxiliary batteries.

4. In combination, a primary source of current, a battery floated thereon, an auxiliary battery normally retained in a charged state by current from said source, and means for at times disconnecting both of said batteries from said source and connecting said auxiliary battery in series with the main battery to augment the voltage thereof.

5. The method of rendering a reserve battery constantly available for augmenting the voltage of a main battery which consists in normally passing through said reserve battery a current substantially equal in energy to the internal losses thereof, and then connecting the reserve battery in series with the main battery.

6. The method of rendering a reserve battery constantly available for augmenting the voltage of a main battery which consists in causing said main battery normally to charge said reserve battery, and then connecting the reserve battery in series with the main battery.

7. In combination, a plurality of batteries, each battery consisting of a plurality of portions in series with each other, a plurality of primary sources of current, switching means for selectively connecting said primary sources with said portion of battery, a first load circuit, switching means for connecting one of said batteries to said first load circuit or more of said batteries to said circuit in parallel with each other, a second load circuit and switching means for connecting a portion or a plurality of portions of the battery in parallel with each other in said second load circuit.

8. In combination, a main battery, a load circuit, an auxiliary battery, means for normally bridging the auxiliary battery across said load circuit to retain the same normally in a charged condition, and switching means for at times connecting said auxiliary battery in series with said main battery in said load circuit to augment the potential thereof.

9. In combination, a main battery comprised of a plurality of portions in series with each other, a first load circuit comprising said main battery and a second load circuit comprising a portion of said main battery, a plurality of auxiliary batteries, a circuit normally connecting said auxiliary batteries in series with each other to one of said load circuits to maintain said auxiliary batteries in a charged state and switching devices for at times interposing said auxiliary batteries in said first and second load circuits respectively to augment the potentials thereof.

10. In combination, a primary source of current, a battery floated thereon, an auxiliary battery normally subjected to a charging current, and means for at times disconnecting said floating battery from said source and connecting said auxiliary battery in series with the floating battery to augment the voltage thereof.

11. In combination, a primary source of current, a battery floated thereon, an auxiliary battery normally connected in parallel thereto, and means for at times disconnecting said floating battery from said source and connecting said auxiliary battery in series with said floating battery to augment the voltage thereof.

12. In combination, a load circuit, a primary source of current and a battery floated thereon for supplying said load circuit, an auxiliary battery comprising a plurality of cells normally subjected to a charging current, switching means for at times disconnecting said floating battery from the primary source of current so that the load circuit will be supplied from the battery alone, and switching means for connecting cells of said auxiliary battery in series with said first mentioned battery to make up for the drop in the voltage of said battery as it discharges into the load circuit.

In testimony whereof I have signed my name to this specification this 8th day of April, 1920.

ROWLAND L. YOUNG.